United States Patent Office 3,849,417
Patented Nov. 19, 1974

3,849,417
CERTAIN 2-BENZENESULFONYLAMINO-
PYRIMIDINES
Manfred Hübner, Ludwigshafen, Ruth Heerdt, Mannheim-Feudenheim, Felix Helmut Schmidt, Mannheim-Seckenheim, Max Thiel, Mannheim, and Rudi Weyer, Frankfurt-Unterliederbach, Germany, assignors to Boehringer Mannheim G.m.b.H., Postfach, Germany
No Drawing. Filed Oct. 11, 1972, Ser. No. 296,744
Claims priority, application Germany, Oct. 20, 1971,
P 21 52 230.5
Int. Cl. C07d 99/04, 99/06
U.S. Cl. 260—256.5 R          10 Claims

ABSTRACT OF THE DISCLOSURE

Certain novel sulfonylaminopyrimidine compounds of the formula:

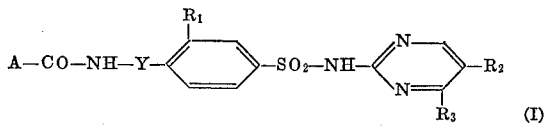

wherein
A is an oxygen- or sulfur-containing bicyclic radical optionally substituted by halogen atoms and/or by alkyl and/or alkoxy radicals containing up to 3 carbon atoms;
Y is a straight-chained or branched alkylene containing up to 3 carbon atoms;
$R_1$ is a hydrogen atom or, together with Y, represents an alkylene bridge of from 3 to 4 carbon atoms;
$R_2$ is straight-chained or branched alkyl, cycloalkyl, cycloalkylalkyl, alkoxy, cycloalkoxy, alkoxyalkyl, alkoxyalkoxy, alkylthio or alkylthioalkyl radical, or phenyl or benzyl; and
$R_3$ is a hydrogen atom or lower alkyl; or
$R_2$ and $R_3$ together form a bridge of 3 to 5 methylene groups;
as well as the physiologically compatible salts thereof;
are outstandingly effective in depressing the blood sugar level in mammals.

The present invention relates to novel sulfonylaminopyrimidine compounds with therapeutic compositions containing same, and with methods of lowering the blood-sugar level in mammals.
It is known from German Patent Specification No. 1,301,817, that certain 2-(furoyl- and thenoyl-aminoalkyl-benzensulfonamido) - pyrimidines have blood sugar depressing activity.
We have now, surprisingly, found that 2-(acylamino-alkylenebenze-sulfonamido)-pyrimidine compounds which contain a bicyclic oxygen- or sulfur heterocycle in the acyl radical, are characterized by stronger antidiabetic effectiveness than that processed by the known compounds.
The present invention provides compounds of the formula:

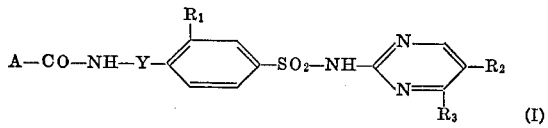

wherein
A is an oxygen- or sulfur-containing bicyclic radical optionally substituted by halogen atoms and/or by alkyl and/or alkoxy radicals containing up to 3 carbon atoms;
Y is a straight-chained or branched alkylene containing up to 3 carbon atoms;
$R_1$ is a hydrogen atom or, together with Y, represents an alkylene bridge of from 3 to 4 carbon atoms;

$R_2$ is straight-chained or branched alkyl, cycloalkyl, cycloalkylalkyl, alkoxy, cycloalkoxy, alkoxyalkyl, alkoxyalkoxy, alkylthio or alkylthioalkyl radical, or phenyl or benzyl; and
$R_3$ is a hydrogen atom or lower alkyl or
$R_2$ and $R_3$ together form a bridge of 3 to 5 methylene groups;
as well as the physiologically compatible salts thereof.
The bicyclic system designated "A" in formula I, above, is preferably one in which only one ring contains a single ring hetero, i.e., oxygen or sulfur, atom, and wherein this ring contains a total of from five to six ring atoms, i.e., from four to five ring carbon atoms. The other ring of the bicyclic system contains from 4 to 7, e.g., 5 or 6, ring carbons, is preferably unsaturated, and is preferably so fused to the hetero ring that the two rings have two carbon atoms in common. The "A" moiety is preferably linked to the —CO—NH portion of formula I, above, through the non-hetero ring, and most preferably through a carbon atom of said non-hetero ring which is adjacent to a carbon atom shared with the hetero ring.
More preferred are compounds in which A is benzofuranyl, 2,3 - dihydrobenzofuranyl, chromanyl or homochromanyl radical or a corresponding thio analog, for example, a 2,3-dihydrobenzothienyl radical.
Most preferably, A is benzofuryl-7, 2,3-dihydrofuryl-7, chromanyl-8 (i.e., dihydrobenzopyranyl-8), homochromanyl-9, and the thio analogs thereof, e.g., (2,3-dihydro)benzothienyl-optionally substituted with halogen, alkyl, and/or alkoxy on either the hetero or non-hetero ring.
The $R_2$ radical in formula I, above, preferably contains not more than 10 carbon atoms overall, contains 5 to 6 ring carbon atoms in cycloalkyl moieties thereof and preferably 1 to 6 carbon atoms in alkyl moieties thereof.
$R_3$ preferably contains not more than six carbon atoms.
The new compounds (I) according to the present invention can be prepared, for example, by one of the following methods:
(a) Reaction of a compound of the general formula:

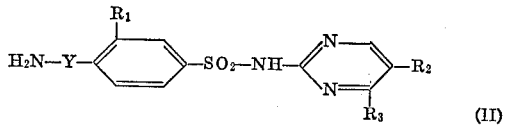

wherein Y, $R_1$, $R_2$ and $R_3$ have the same meanings as above, with a reactive derivative of an acid of the general formula:

A—COOH          (III)

wherein A has the same meaning as above; or
(b) Reaction of a compound of the general formula:

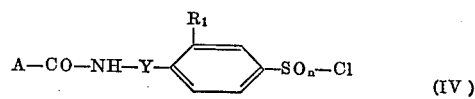

wherein A, Y and $R_1$ have the same meanings as above and $n$ is 0, 1 or 2, with a 2-aminopyrimidine of the general formula:

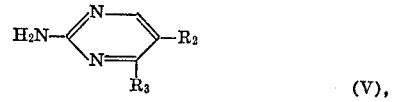

wherein $R_2$ and $R_3$ have the same meanings as above, whereafter, if necessary, the compound obtained is subsequently oxidized to the corresponding sulfonamide; or (c) Reaction of benzene-sulfonyl-guanidines of the general formula:

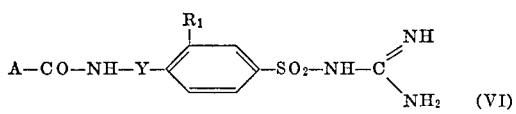

wherein A, Y and $R_1$ have the same meanings as above, with compounds of the general formula:

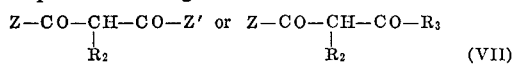

wherein $R_2$ and $R_3$ have the same meanings as above and Z or Z', which can be the same or different, are hydrogen atoms or alkoxy radicals, or with a functional derivative thereof, whereafter, when the product obtained is hydroxylated in the 4- and/or 6-position of the pyrimidine ring, it is first converted into the corresponding halogen compound and thereafter subjected to reductive dehalogenation to give the desired pyrimidine; or (d) Reaction of a sulfonamide of the general formula:

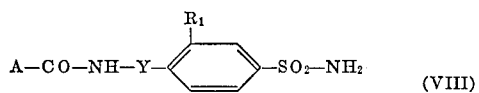

wherein A, Y and $R_1$ have the same meanings as above, with a pyrimidine derivative of the general formula:

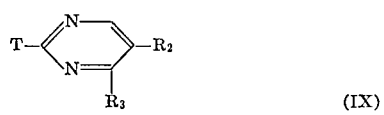

wherein $R_2$ and $R_3$ have the same meanings as above and T is a reactive ester group or a low molecular weight trialkyl-ammonio group; whereafter, the compound obtained is, if desired, converted into a physiologically compatible salt by reaction with a non-toxic base.

The acylation of the compounds (II) is carried out in the usual manner by reaction with reactive derivatives of the acids (III), for example, with acid halides, preferably in the presence of an acid acceptor.

The reaction of compounds (IV) and (V) is preferably carried out in an inert solvent in the presence of a base, preferably of pyridine or trimethylamine. However, it is also possible to use an excess of the aminopyrimidine in order to take up the hydrogen chloride formed by the reaction. The subsequent oxidation of the sulfenamides ($n=0$) or of the sulphinamides ($n=1$) is carried out in the usual manner, for example, by reaction with hydrogen peroxide, potassium permanganate or nitric acid.

The condensation of the acylaminoalkyl-benzene-sulfonylguanidines (VI) with the β-dicarbonyl compounds (VII) can be carried out, for example, by means of an alkali metal alcoholate in an alcohol. The β-dicarbonyl compounds can be used either in free form or in the form of functional derivatives, for example acetals; however, they can also be prepared in a "one pot process" by the Vilsmeier method from aldehyde acetals or the corresponding enamines, an inorganic acid chloride and a dialkyl formamide. If, instead of the dicarbonyl compounds, there are used appropriately substituted malonic acid diesters, malonic ester aldehydes or functional derivatives thereof, then the hydroxyl groups present in the 4- and/or 6-position of the pyrimidine formed must subsequently be replaced by halogen, such as chlorine, by reaction with an inorganic acid halide which can then easily be replaced by hydrogen by reduction with, for example zinc dust.

The acylaminoalkyl-benzene-sulfonyl-guanidines (VI) used as starting materials can be obtained, for example, by the Schotten-Baumann reaction from acylaminoalkyl-benzene-sulfochlorides with guanidine salts and aqueous sodium hydroxide solution.

The condensation of the acylaminoalkyl-benzene-sulfonamides (VIII) with the compounds (IX) is preferably carried out in the presence of a base, for example, potassium carbonate.

As starting compounds of general formula (IX), there are preferably used 2-halopyrimidines; they can be obtained, for example, by reaction of 2-hydroxypyrimidines with excess phosphorus oxychloride. Instead of 2-halopyrimidines, there can also be used the corresponding trialkyl-ammonio-pyrimidines for the reaction with the sulfonamides, to give the desired acylaminoalkyl-benzene-sulfonylamino-pyrimidines, a trialkylamine being formed as by-product.

As physiologically compatible salts, there are especially preferred the alkali metal, alkaline earth metal and ammonium salts, as well as the salts with basic compounds having a blood sugar-depressing action, especially biguanides. The preparation of these salts takes place in known manner, for example, by reaction with an aqueous solution of an alkali metal or alkaline earth metal hydroxide, with an aqueous solution of ammonia or with an aqueous solution of the corresponding carbonates.

The following Examples are given for the purpose of illustrating the present invention.

EXAMPLE 1

Preparation of 4 - [2 - (5-Methoxy-2-methyl-2,3-dihydrobenzo[b]furoyl - (7) - amino)ethyl]-N-[5-(cyclohexylmethyl)-pyrimidinyl-(2)]-benzene-sulfonamide

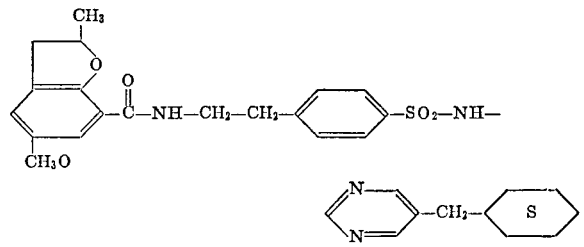

2.1 g. 5-methoxy-2-methyl-2,3-dihydrobenzo[b]furane-7-carboxylic acid (m.p. 122–123° C.) and 4 ml. thionyl chloride were heated under reflux for 3 hours. Thereafter, excess thionyl chloride was completely distilled off in a vacuum and the 5-methoxy-2-methyl-2,3-dihydrobenzo[b]furan-7-carboxylic acid chloride which remains behind was taken up in 10 ml. anhydrous methylene chloride.

This solution was added dropwise, with ice cooling, to a solution of 3.3 g. 4-(2-aminoethyl)-N-[5-cyclohexylmethyl)-pyrimidinyl-(2)]-benzene sulphonamide hydrochloride (m.p. 260–262° C.) in 8 ml. 2N aqueous sodium hydroxide solution and 30 ml. water. The pH value was maintained at about 12 by the gradual addition of further aqueous sodium hydroxide solution. The reaction mixture was further stirred for 1 hour, then acidified with acetic acid and the methylene chloride evaporated off by heating. The precipitated crude product was dissolved in very dilute aqueous sodium hydroxide solution, the solution was treated with active charcoal and the product was reprecipitated by passing in carbon dioxide, again dissolved in aqueous sodium hydroxide solution and reprecipitated by the addition of hydrochloric acid. For further purification, the product was recrystallized twice from ethanol. There were thus obtained 3.2 g. (70.7% of theory) 4-[2-(5-methoxy-2-methyl-2,3-dihydrobenzo[b]-furoyl - (7) - amino)ethyl]-N-[5-cyclohexylmethyl)-pyrimidinyl-(2)]benzene-sulfonamide; m.p. 183–185° C.

The following compounds were prepared in an analogous manner:

4 - [2 - (2,4-dimethyl-2,3-dihydrobenzo[b]furoyl-(7)-amino) - ethyl] - N-[5-propyl-pyrimidinyl-(2)]-benzene-sulfonamide; after recrystallization from nitromethane, it melts at 169–172° C.;

4 - [2 - (2,5-dimethyl-2,3-dihydrobenzo [b]furoyl-(7)-amino) - ethyl] - N-[5-benzyl-pyrimidinyl-(2)]-benzenesulfonamide; aftetr recrystallization from nitropropane, it melts at 182–184° C.;

4 - [2 - (2,5-dimethyl-2,3-dihydrobenzo[b]furoyl-(7)-amino) - ethyl] - N-[5-(2-methoxyethoxy)-pyrimidinyl-(2)]-benzene sulfonamide; after recrystallization from ethanol, it melts at 157–159° C.;

4 - [2 - (2,5-dimethyl-2,3-dihydrobenzo[b]furoyl-(7)-amino) - ethyl] - N-[5-phenyl-pyrimidinyl-(2)]-benzene-sulfonamide; after recrystallization from nitropropane, it melts at 183–185° C.;

4 - [2 - (5-chloro-2-methyl-benzo[b]furoyl-(7)-amino)-ethyl] - N - [5-isobutyl-pyrimidinyl-(2)]-benzene-sulfonamide; m.p. 181–182° C. (The product was first recrystallized from a mixture of methanol and methylene chloride and then from acetone; it contains 0.5 mole acetone of crystallization);

4 - [2 - (5-chloro-2-methyl-2,3-dihydrobenzo[b]furoyl-(7) amino) - ethyl]-N-[5-ethylthiomethyl)-pyrimidinyl-(2)]-benzene-sulfonamide; after recrystallization from ethanol, it melts at 168–170° C.;

2 - [5 - chloro-2-methyl-2,3-dihydrobenzo[b]furoyl-(7)-amino] - N-[5-isobutyl-pyrimidinyl-(2)]-indane-5-sulfonamide; after recrystallization from nitromethane, it melts at 241–244° C.;

2 - [chromanyl - (8)-carbonylamino]-N-[5-isopropyl-thiopyrimidinyl - (2)] - 1,2,3,4-tetrahydronaphthalene-7-sulfonamide, which has the formula

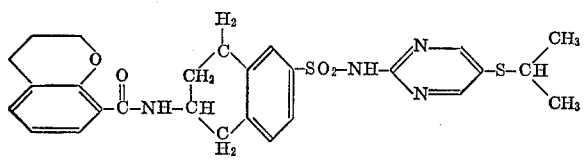

m.p. 118–120° C.; (for purification, the sodium salt was recrystallized from water and the sodium salt subsequently converted into the free compound with dilute hydrochloric acid).

4 - [2 - homochromanyl-(9)-carbonylamino-ethyl]-N-[5,6,7,8 - tetrahydroquinazolinyl - (2)]-benzene-sulfonamide; after recrystallization from a mixture of isopropanol and benzene, it melts at 221-223° C.

4 - [2 - (2 - methyl - 2,3-dihydrobenzo[b]thenoyl-(7)-amino) - ethyl] - N-[5-isobutyl-pyrimidinyl-(2)]-benzene-sulfonamide; m.p. 168–170° C.

EXAMPLE 2

Preparation of 4-[2-(5-chloro-2-methyl-benzo[b]furoyl-(7) - amino) - ethyl]N-[5-isobutoxy-pyrimidinyl-(2)]-benzene-sulfonamide 2.6 g. 5-chloro-2-methyl-benzo[b]furane-7-carboxylic acid (m.p. 230° C.) were suspended in 30 ml. acetone and mixed while stirring and ice cooling, with 1.26 g. triethylamine and subsequently with 1.2 g. ethyl chloroformate. After further stirring the reaction mixture for 10 minutes, it was added portionwise, with cooling, to a solution of 4.35 g. 4-(β-amino-ethyl) - N - [5-isobutoxypyrimidinyl-(2)]-benzene sulfonamide (m.p. 239° C.) and sodium acetate in a mixture of 20 ml. water and 20 ml. acetone. The reaction mixture was further stirred for 1 hour at ambient temperature, mixed with water and acidified with hydrochloric acid. The product which separates was filtered off with suction and then recrystallized from a mixture of ethanol and dimethyl formamide. There was thus obtained 4 - [2-(5-chloro-2-methyl-benzo[b]furoyl-(7)-amino) - ethyl]-N-[5-isobutoxy-pyrimidinyl-(2)]-benzene sulfonamide, which melts at 198–199° C.

The following compounds were obtained in an analogous manner:

4 - [2 - (5-chloro-2-methyl-benzo[b]furoyl-(7)-amino)-ethyl] - N - [5 - cyclohexyl - pyrimidinyl - (2)] - benzene-sulfonamide; after recrystallization from a mixture of ethanol and dimethyl formamide, it melts at 218–220° C.;

4 - [2 - (5-chloro-2-methyl-benzo[b]furoyl-(7)-amino)-ethyl] - N - [4-methyl-5-isopropyl-pyrimidinyl-(2)]-benzene-sulfonamide; after recrystallization from ethanol and dimethyl formamide, it melts at 190–192° C.

EXAMPLE 3

Preparation of 4-[2-(5-chloro-2-methyl-2,3-dihydrobenzo[b]furoyl - (7) - amino) - ethyl] - N - [5 - isopropoxy-pyrimidinyl-(2)]-benzene-sulfonamide 3.3 g. 4-[2 - (5-chloro-2-methyl-2,3-dihydrobenzo[b]furoyl-(7)-amino)ethyl]-benzene-sulfochloride (m.p. 156–159° C.) were introduced, with ice cooling, into 1.22 g. 2-amino-5-isopropoxy-pyrimidine (m.p. 73–75° C.) in 5 ml. anhydrous pyridine. The reaction mixture was first left to stand for 2 hours at ambient temperature, then heated on a steambath for 2 hours and, after cooling, poured into dilute hydrochloric acid (100 ml. water and 15 ml. concentrated hydrochloric acid). The crude product which precipitates out is filtered off with suction. For purification, it was dissolved in dilute aqueous sodium hydroxide solution and the solution was treated with active charcoal and the substance again precipitated out by the addition of dilute hydrochloric acid. Thereafter, it was recrystallized from methanol, with the addition of some methylene chloride. There was obtained 1.4 g. (33% of theory) 4-[2-(5-chloro-2-methyl-2,3-dihydrobenzo[b]furoyl - (7) - amino)-ethyl]-N-[5-isopropoxy-pyrimidinyl-(2)]-benzene-sulfonamide, which melts at 196° C.

The following compounds were obtained in an analogous manner:

4-[2-(5-chloro - 2 - methyl - 2,3 - dihydrobenzo[b]furoyl-(7)-amino)-ethyl] - N - [5-isobutyl-pyrimidinyl-(2)]-benzene-sulfonamide; after recrystallization from ethanol, it melts at 169° C.;

4-[2-(5-chloro - 2 - methyl - 2,3 - dihydrobenzo[b]furoyl-(7)-amino)-ethyl] - N - [5-(ethylthiomethyl)-pyrimidinyl-(2)]-benzene-sulfonamide; after recrystallization from ethanol, it melts at 168–170° C.;

4-[2-(5-chloro - 2 - methyl-2,3-dihydrobenzo[b]furoyl-(7)-amino)-ethyl] - N - [4-methyl - 5 - ethylthio-pyrimidinyl-(2)]-benzene-sulfonamide; after recrystallization from methanol, it melts at 160–162° C.;

4-[2-(6 - chlorochromanyl-(8)-carbonylamino)-ethyl]-N-[5-methoxymethyl)-pyrimidinyl - (2)] - benzene-sulfonamide; after recrystallization first from benzene and thereafter from methanol, it melts at 116–118° C.

EXAMPLE 4

Preparation of 4-[2-(5-Chloro-2-methyl-2,3-dihydrobenzo[b]furoyl-(7)-amino)-ethyl] - N - [5-isobutylpyrimidinyl-(2)]-benzene-sulfonamide 3.2 ml. liquified phosgene were pipetted into a solution of 3.3 ml. dimethyl formamide in 20 ml. anhydrous methylene chloride, cooled with an ice-salt mixture. Subsequently, with further cooling, 3.8 g. isocapronaldehyde diethyl acetal were added thereto, the mixture slowly warmed and then heated under reflux for 4 hours, the crystalline slurry thereby going into solution. Thereafter, the methylene chloride was distilled off, the residue was taken up in 6 ml. anhydrous methanol, the solution neutralized with a solution of sodium methylate, a further 6.4 ml. of 30% sodium methylate solution was added, as well as 9.6 g. 4-[2-(5-chloro-2-methyl-2,3-dihydrobenzo-[b]furoyl-(7)-amino)-ethyl] - benzene - sulfonyl-guanidine (m.p. 225–228° C.), and the reaction mixture heated under reflux for 12 hours.

Thereafter, the methanol was distilled off and the residue digested at an elevated temperature with water, with the addition of a dilute aqueous solution of sodium hydroxide. Unreacted sulfonyl-guanidine was recovered by filtering off with suction: after drying, it can be used for a new batch. The alkaline solution was treated with active charcoal and, by acidification with dilute hydrochloric acid, 4-[2-(5-chloro-2-methyl-2,3-dihydrobenzo-[b]furoyl-(7)-amino)-ethyl]-N-[5 - isobutyl-pyrimidinyl-(2)]-benzene-sulfonamide is precipitated out. After recrystallization from ethanol, it melts at 168–169° C.

EXAMPLE 5

Preparation of 4-[2-(5-Chloro - 2 - methyl - 2,3 - dihydrobenzo[b]furoyl-(7)-amino)-ethyl] - N - [5-isobutyl-pyrimidinyl-(2)]-benzene-sulfonamide From 4-[2-(5 - chloro-2-methyl-2,3-dihydrobenzo[b]furoyl-(7)-amino)-ethyl]-benzene-sulfonamide (m.p. 240–243° C.), there was first prepared the sodium salt by the addition of the equivalent amount of sodium methylate solution in ethanol, whereafter the sodium salt was well dried. Furthermore, 2-chloro-5-isobutyl-pyrimidine was reacted in benzene at ambient temperature with excess trimethylamine to give 2-trimethylammonio-5-isobutyl-pyrimidine chloride (m.p. 165° C. (decomp.)).

4.2 g. 4-[2-(5 - chloro-2-methyl-2,3-dihydrobenzo[b]furoyl-(7)-amino)ethyl]-benzene sulfonamide sodium salt and 2.3 g. 2-trimethylammonio-5-isobutyl-pyrimidine chloride were stirred for 8 hours at ambient temperature in 15 ml. N,N-dimethyl-acetamide, left to stand overnight and then diluted with water to about 100 ml. The precipitate formed was filtered off with suction and digested at an elevated temperature with a dilute aqueous solution of sodium carbonate: unreacted 4-[2-(5-chloro-2-methyl-2,3 - dihydrobenzo[b]furoyl-(7)-amino)-ethyl]-benzene-sulfonamide remains undissolved and was recovered by filtering off with suction. The sodium carbonate solution was acidified with diluted hydrochloric acid in order to precipitate out the 4-[2-(5-chloro-2-methyl-2,3-dihydrobenzo[b]furoyl-(7)-amino)-ethyl] - N - [5-isobutyl-pyrimidinyl-(2)]-benzene-sulfonamide, which was recrystallized from ethanol, whereafter it melts at 168–169° C.

EXAMPLE 6

Preparation of 1-(2-Phenyl-ethyl)-biguanide salt of 4-[2-(2,5 - dimethyl-2,3-dihydrobenzo[b]furoyl-(7)-amino)-ethyl] - N - [5-(2-methoxyethoxy)-pyrimidinyl-(2)]-benzene-sulfonamide 1.75 g. 4-[2-(2,5-dimethyl-2,3-dihydrobenzo[b]furoyl-(7)-amino)-ethyl]-N-[5 - (2 - methoxyethoxy)-pyrimidinyl-(2)]-benzene-sulfonamide and 0.63 ml. 30% sodium methylate solution are heated in 50 ml. anhydrous ethanol, 0.8 g. 1-(2-phenylethyl)-biguanide hydrochloride were added thereto and the reaction mixture heated under reflux for 4 hours. After cooling, the precipitated sodium chloride was filtered off with suction and the filtrate concentrated in a vacuum to about 10 ml., thereafter mixed with about 30 ml. anhydrous ether and the desired salt thus obtained filtered off with suction. It melts at 108–110° C.

The blood sugar reducing activity of test compounds representative of this invention was measured in the rabbit following i.e. administration of the test compounds. In each instance, the threshold dosage, i.e., the lowest dosage of compound required to produce a significant reduction in the blood sugar level, was determined. The values reported in Table I, below, are relative values, based on the standard substance $N_1$-(sulfanilyl)-$N_2$-(n-butyl) urea which has a value of 1. The threshold dosage of this standard substance was 200 mg./kg. in this test series.

For purposes of comparison, 2-benzene sulfonamide-5-methoxyethoxypyrimidine (sold under the trade name "Redul") and - $N_1$-(sulfanilyl)-$N_2$-(n-butyl)urea (sold under the trade name "Nadisan"), were also tested under the same conditions.

The results are set forth in Table I, below.

TABLE I

| Compound No. (preparative Example No.) | Chemical name | Relative blood sugar reducing activity |
| --- | --- | --- |
| 1 (1, sixth listing) | 4-[2-(5-chloro-2-methyl-benzo]b[furoyl-(7)-amino)-ethyl]-N-[5-isobutyl-pyrimidinyl-(2)-]-benzene-sulfonamide. | 8,000 |
| 2 (3, second listing). | 4-[2-(5-chloro-2-methyl-2,3-dihydrobenzo[b]furoyl-(7)-amino)-ethyl]-N-[5-isobutyl-pyrimidinyl-(2)]-benzene-sulfonamide. | 8,000 |
| 3 (1, eighth listing). | 2-[5-chloro-2-methyl-2,3-dihydrobenzo-[b]furoyl-(7)-amino]-N-[5-isobutyl-pyrimidinyl-(2)]-indane-5-sulfonamide. | 8,000 |
| 4 (3, first listing) | 4-[2-(5-chloro-2-methyl-2,3-dihydrobenzo[b]furoyl-(7)-amino)-ethyl]-N-[5-isopropoxy-pyrimidinyl-(2)]-benzenesulfonamide. | 4,000 |
| 5 (1, fourth listing). | 4-[2-(2,5-dimethyl-2,3-dihydrobenzo[b]furoyl-(7)-amino)-ethyl]-N-[5-(2-methoxyethoxy)-pyrimidinyl-(2)-]-benzenesulfonamide. | 4,000 |
| 6 (1, fifth listing) | 4-[2-(2,5-dimethyl-2,3-dihydrobenzo[b]furoyl-(7)-amino)-ethyl]-N-[5-phenyl-pyrimidinyl-(2)]-benzenesulfonamide. | 4,000 |
| 7 (1, seventh listing. | 4-[2-(5-chloro-2-methyl-2,3-dihydrobenzo[b]furoyl-(7)-amino)-ethyl]-N-[5-ethylmercaptomethyl)-pyrimidinyl-(2)]-benzenesulfonamide. | 4,000 |
| 8 (3, fifth listing) | 4-[2-(6-chloro-chromanyl-(8)-carbonyl-amino)-ethyl]-N-[5-(methoxymethyl)-pyrimidinyl-(2)]-benzenesulfonamide. | 2,000 |
| 9 (3, fourth listing). | 4-[2-(5-chloro-2-methyl-2,3-dihydrobenzo[b]furoyl-(7)-amino)-ethyl]-N-[4-methyl-5-ethylmercaptopyrimidinyl dinyl-(2)]-benzenesulfonamide. | 2,000 |
| 10 (1, first listing) | 4-[2-)5-methoxy-2-methyl-2,3-dihydrobenzo[b]furoyl-(7)-amino)-ethyl]-N-[5-cyclohexylmethyl)-pyrimidinyl-(2(]-benzenesulfonamide. | 800 |
| Comparison compound. | $N_1$-sulfanilyl-$N_2$-(n-butyl)-urea | 1 |
| Comparison compound. | 2-benzenesulfonamido-5-methoxyethoxy-pyrimidine. | 10 |

It is evident from the test results set forth in Table I that the compounds of this invention are more effective, by several orders of magnitude, than 2-benzene-sulfonamido-5-methoxyethoxypyrimidine and $N_1$-sulfanilyl)-$N_2$-(n-butyl)urea. The threshold dosage of the instant compound ranges from 0.025 to 0.25 mg./kg., compared to 200 mg./kg. for $N_1$-(sulfanilyl)-$N_2$-(n-butyl)urea.

The dosage of the novel compounds of the present invention for the treatment of diabetes depends in the main on the age, weight, and condition of the patient being treated. The preferable form of administration is via the oral route in connection with which dosage units containing 5–500 mg. of active compound in combination with a suitable pharmaceutical diluent is employed. One or two unit dosages are good from one to four times a day.

Some of the novel compounds were also tested with regard to their peroral effectiveness in rabbits. In these tests the compound was formulated in a tylose suspension and administered to the animals by means of a stomach tube. The blood sugar level of the treated animals were compared with animals treated with a placebo. The following were the results, from which it will be seen that the instant compounds were markedly effective in achieving a reduction in the blood sugar level. These effects were long lasting and pronounced.

TABLE II

| Compound number | Chemical name | Threshold dosage* mg./kg. |
|---|---|---|
| 1 | 4-[2-(5-chloro-2-methyl-benzo[b]furoyl-(7)-amino)-ethyl]-N-[5-isobutyl-pyrimidinyl-(2)]-benzolsulfonamide. | 0.1 |
| 2 | 4-[2-(5-chloro-2-methyl-2,3-dihydrobenzo[b]furoyl-(7)-amino)-ethyl]-N-[5-isobutyl-pyrimidinyl-(2)]-benzolsulfonamide. | 0.05 |
| 3 | 2-[5-Chloro-2-methyl-2,3-dihydrobenzo[b]furoyl-(7)-amino]-N-[5-isobutyl-pyrimidinyl-(2)]-indane-5-sulfonamide. | 0.1 |
| 4 | 4-[2-(5-chloro-2-methyl-2,3-dihydrobenzo[b]furoyl-(7)-amino)-ethyl]-N-[5-isopropoxy-pyrimidinyl-(2)]-benzolsulfonamide. | 0.25 |
| 6 | 4-[2-(2,5-dimethyl-2,3-dihydro-benzo[b]furoyl-(7)-amino)-ethyl]-N-[5-phenyl-pyrimidinyl-(2)]-benzolsulfonamide. | 0.25 |
| 7 | 4-[2-(5-chloro-2-methyl-2,3-dihydro-benzo[b]furoyl-(7)-amino)-ethyl]-N-[5-(ethylmercaptomethyl)-pyrimidinyl-(2)]-benzolsulfonamide. | 0.25 |

*The threshold dosage was determined as described above for the tests reported in Table I, supra.

The compounds (I) and the physiologically compatible salts thereof can be administered enterally and parenterally in liquid or solid form in admixture with a liquid or solid pharmaceutical diluent or carrier. As injection medium, water is preferably used which contains the additives usual for injection solutions, for example stabilization agents, solubilizing agents and/or buffers. Additives of this type include, for example, tartrate and borate buffers, ethanol, complex-forming agents (for example ethylenediamine-tetracetic acid and the non-toxic salts thereof and high molecular weight polymers (for example, liquid polyethylene oxide) for viscosity regulation. Solid carrier materials include, for example, starch, lactose, mannitol, methyl-cellulose, talc, highly-dispersed silicic acid, high molecular weight fatty acids (for example, stearic acid), gelatin, agar-agar, calcium phosphate, magnesium stearate, animal and vegetable fats and solid high molecular weight polymers (for example, polyethylene glycols). Compositions suitable for oral administration can, if desired, contain flavoring and/or sweetening agents.

It will be understood that the specification and examples are illustrative but not limitative of the present invention and that other embodiments within the spirit and scope of the invention will suggest themselves to those skilled in the art.

What is claimed is:

1. Sulfonylaminopyrimidine compound of the formula

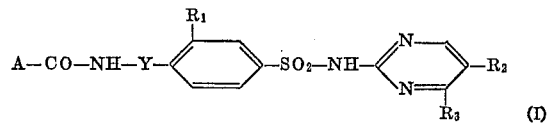

wherein

A is an oxygen- or sulfur-containing bicyclic radical of the formula

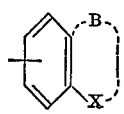

wherein

X is oxygen or sulfur and B is alkylene of up to 4 carbon atoms or CH=CH; and wherein said radical may be substituted with one or two members of the group consisting of halogen and alkyl and alkoxy having not more than three carbons atoms;

Y is a straight-chained or branched alkylene containing up to 3 carbon atoms;

$R_1$ is a hydrogen atom or, together with Y, represents an alkylene bridge of from 3 to 4 carbon atoms;

$R_2$ is straight-chained or branched alkyl, cycloalkyl, cycloalkylalkyl, alkoxy, cycloalkoxy, alkoxyalkyl, alkoxyalkoxy, alkylthio or alkylthioalkyl, phenyl, or benzyl and wherein $R_2$ contains not more than 10 carbon atoms;

$R_3$ is a hydrogen atom or lower alkyl of from 1 to 6 carbon atoms; or $R_2$ and $R_3$ together form a bridge of 3 to 5 methylene groups;

as well as the physiologically compatible salts thereof.

2. Compound as claimed in claim 1 wherein X is oxygen.

3. Compound as claimed in claim 1 wherein X is sulfur.

4. Compound as claimed in claim 1 wherein A is benzofuranyl, 2,3-dihydrobenzofuranyl, chromanyl or homochromanyl and the thio analogs thereof.

5. Compound as claimed in claim 1 wherein A is benzofuranyl-7, 2,3-dihydrofuryl-7, chromanyl-8, homochromanyl-9, benzothienyl-7, and 2,3-dihydrobenzothienyl-7.

6. Compound as claimed in claim 1 wherein $R_2$ is a cycloalkyl containing moiety wherein the cycloalkyl moiety contains 5 to 6 ring atoms.

7. Compound as claimed in claim 1 wherein $R_2$ is an alkyl containing moiety and said alkyl moiety contains from 1 to 6 carbon atoms.

8. Compound as claimed in claim 1 designated 4-[2-(5-chloro-2-methyl-benzo[b]furoyl-(7)-amino) - ethyl] - N - [5-isobutylpyrimidinyl-(2)]-benzenesulfonamide.

9. Compound as claimed in claim 1 designated 4-[2-(5-chloro-2-methyl - 2,3 - dihydrobenzo[b]furoyl - (7)-amino)-ethyl]-N-[5-isobutylpyrimidinyl - (2)] - benzenesulfonamide.

10. Compound as claimed in claim 1 designated 2-[5-chloro-2-methyl-2,3 - dihydro - benzo[b]furoyl - (7) - amino]-N-[5-isobutylpyrimidinyl-(2) - indane-5 - sulfonamide.

References Cited

UNITED STATES PATENTS 3,637,698    1/1972    Shetty _____ 260—256.5 R

RICHARD J. GALLAGHER, Primary Examiner

U.S. Cl. X.R.

424—251